(12) United States Patent
Engelfried et al.

(10) Patent No.: US 9,744,686 B2
(45) Date of Patent: Aug. 29, 2017

(54) MACHINE TOOL SEPARATING DEVICE

(71) Applicant: Robert Bosch GmbH, Stuttgart (DE)

(72) Inventors: Uwe Engelfried, Ostfildern (DE); Petr Grulich, Kirchheim/Teck (DE)

(73) Assignee: Robert Bosch GmbH, Stuttgart (DE)

( * ) Notice: Subject to any disclaimer, the term of this patent is extended or adjusted under 35 U.S.C. 154(b) by 46 days.

(21) Appl. No.: 14/382,550

(22) PCT Filed: Jan. 4, 2013

(86) PCT No.: PCT/EP2013/050108
§ 371 (c)(1),
(2) Date: Sep. 2, 2014

(87) PCT Pub. No.: WO2013/127544
PCT Pub. Date: Sep. 6, 2013

(65) Prior Publication Data
US 2015/0059190 A1    Mar. 5, 2015

(30) Foreign Application Priority Data

Mar. 2, 2012 (DE) .................. 10 2012 004 053

(51) Int. Cl.
  *B27B 33/14*    (2006.01)
  *B27B 17/02*    (2006.01)
  *B23D 65/00*    (2006.01)
(52) U.S. Cl.
  CPC .............. *B27B 33/14* (2013.01); *B23D 65/00* (2013.01); *B27B 17/02* (2013.01); *Y10T 83/909* (2015.04)

(58) Field of Classification Search
  CPC ..... B27B 33/14; B27B 33/142; B27B 33/144; B27B 33/148; Y10T 83/909; Y10T 83/913; Y10T 83/9326
  (Continued)

(56) References Cited

U.S. PATENT DOCUMENTS

| 614,003 | A | * | 11/1898 | Johnson | ................. | B23D 53/02 |
| | | | | | | 83/820 |
| 1,483,387 | A | * | 2/1924 | Serin | ....................... | B27B 17/00 |
| | | | | | | 30/381 |

(Continued)

FOREIGN PATENT DOCUMENTS

| AU | 1778676 A | 3/1978 |
| DE | 419108 | 9/1925 |

(Continued)

OTHER PUBLICATIONS

DE814787 english translation; Raible Rudolf; B27B33/14; Sep. 27, 1951.*

(Continued)

*Primary Examiner* — Laura M Lee
(74) *Attorney, Agent, or Firm* — Maginot, Moore & Beck LLP

(57) ABSTRACT

A machine tool separating device, in particular a manual machine tool separating device, includes at least one cutting train that comprises at least one cutter-support element and at least one connecting element that is integrally formed with the cutter-support element. The cutter-support element has at least one transverse securing element that is configured to secure the cutter-support element against a transverse movement relative to another cutter-support element of the cutting train to the greatest extent possible in the assembled state.

8 Claims, 2 Drawing Sheets

(58) Field of Classification Search
USPC .................... 83/838, 840–844, 830–834
See application file for complete search history.

(56) References Cited

U.S. PATENT DOCUMENTS

| | | | | |
|---|---|---|---|---|
| 1,520,422 | A | * | 12/1924 | Lind ........................ B27B 33/14 83/830 |
| 1,559,522 | A | * | 10/1925 | Frunk ..................... B27B 33/14 83/830 |
| 1,634,643 | A | * | 7/1927 | Bens ..................... B27B 33/142 83/832 |
| 1,655,856 | A | * | 1/1928 | Bens ....................... B27B 33/14 83/832 |
| 2,204,344 | A | * | 6/1940 | Doberstein ............. E21C 25/36 299/84.1 |
| 2,348,612 | A | | 5/1944 | Deacon |
| 2,605,788 | A | * | 8/1952 | Reid ..................... B27B 33/142 83/832 |
| 2,747,624 | A | * | 5/1956 | Cox ..................... B27B 33/148 474/223 |
| 2,774,395 | A | | 12/1956 | Tweedie |
| 2,798,381 | A | * | 7/1957 | Siverson ................ B27B 33/14 474/206 |
| 3,228,437 | A | * | 1/1966 | Wezel ..................... A22B 5/206 83/830 |
| 3,910,147 | A | * | 10/1975 | Heyerdahl ............. B23D 65/00 29/509 |
| 4,382,334 | A | * | 5/1983 | Reynolds ............. B23D 63/168 144/73 |
| 4,754,549 | A | | 7/1988 | Fischer et al. |
| 4,901,613 | A | | 2/1990 | Carlton |
| 5,123,400 | A | * | 6/1992 | Edgerton ................ B27B 33/14 125/21 |
| 5,772,957 | A | | 6/1998 | Thomson et al. |

FOREIGN PATENT DOCUMENTS

| | | |
|---|---|---|
| DE | 814 787 C | 9/1951 |
| DE | 814 938 C | 9/1951 |
| DE | 2 358 559 | 5/1974 |
| DE | 76 28 843 | 2/1977 |
| DE | 36 40 857 A1 | 6/1988 |
| EP | 0 423 501 A2 | 4/1991 |
| FR | 2 256 796 | 8/1975 |

OTHER PUBLICATIONS

FR2256796 english translation; Ugine Carbone; B27B33/14; Aug. 1, 1975.*
International Search Report corresponding to PCT Application No. PCT/EP2013/050108, mailed May 2, 2013 (German and English language document) (7 pages).

* cited by examiner

MACHINE TOOL SEPARATING DEVICE

This application is a 35 U.S.C. §371 National Stage Application of PCT/EP2013/050108, filed on Jan. 4, 2013, which claims the benefit of priority to Serial No. DE 10 2012 004 053.9, filed on Mar. 2, 2012 in Germany, the disclosures of which are incorporated herein by reference in their entirety.

BACKGROUND

There are already known power-tool parting devices, in particular hand power tool parting devices, which have a cutting strand that comprises at least one cutter carrier element.

SUMMARY

The disclosure is based on a power-tool parting device, in particular a hand power-tool parting device, having at least one cutting strand, which comprises at least one cutter carrier element and at least one connecting element (20).

It is proposed that the cutter carrier element have at least one transverse securing element, which is provided to secure insofar as possible the cutter carrier element, when in a mounted state, against a transverse movement relative to a further cutter carrier element of the cutting strand. The transverse securing element is preferably formed on to the cutter carrier element by tensile forming. It is also conceivable, however, for the transverse securing region to be disposed on the cutter carrier element by means of another type of connection considered appropriate by persons skilled in the art, such as, for example, by means of a form-fit connection method (clip on by means of resilient hook regions, etc.), by means of a welding method, etc. Particularly preferably, the cutter carrier element has at least one stamped transverse securing element. Preferably, the cutter carrier element, when in a mounted state, is coupled to the further cutter carrier element, in particular connected in a form-fitting manner. A "cutting strand" is to be understood here to mean, in particular, a unit provided to locally undo an atomic coherence of a workpiece on which work is to be performed, in particular by means of a mechanical parting-off and/or by means of a mechanical removal of material particles of the workpiece. Preferably, the cutting strand is provided to separate the workpiece into at least two parts that are physically separate from each other, and/or to part off and/or remove, at least partially, material particles of the workpiece, starting from a surface of the workpiece. Particularly preferably, the cutting strand, when in at least one operating state, is moved in a revolving manner, in particular along a circumferential direction of a guide unit of the power-tool parting device. A "cutter carrier element" is to be understood here to mean, in particular, an element on which there is disposed at least one cutting element for parting off and/or removing material particles of a workpiece on which work is to be performed.

A "transverse securing element" is to be understood here to mean, in particular, an element that, as a result of a form fit and/or as a result of a force fit, to secure a movement along a transverse axis that is at least substantially perpendicular to a cutting plane of the cutting strand. Preferably, the transverse securing element is realized so as to differ from a rivet head or a screw head. Preferably, the transverse securing element is provided to secure, or delimit, a transverse movement, by means of a form fit. It is also conceivable, however, for the transverse securing element to at least secure, or limit, a transverse movement in a different manner, considered appropriate by persons skilled in the art, such as, for example, by means of a magnetic force. The expression "when the cutter carrier element is in a mounted state, to secure insofar as possible against a transverse movement relative to a further cutter carrier element of the cutting strand" is intended here to define, in particular, a delimitation of a movement of the cutter carrier elements, connected to each other by means of at least one connecting element, relative to each other, by means of the transverse securing element, along a movement distance that is at least substantially perpendicular to a cutting plane of the cutting strand. The movement distance of the cutter carrier elements relative to each other in this case is limited, in particular by means of the transverse securing element, to a value of less than 5 mm, preferably less than 2 mm, and particularly preferably less than 1 mm.

The term "connecting element" is intended here to define, in particular, an element provided to join together in a form-fitting and/or force-fitting manner, in particular to join together in a movable manner, at least two components, in order to transmit a driving force and/or a driving torque. In this context, "provided" is to be understood to mean, in particular, specially designed and/or specially equipped. By means of the design according to the disclosure, it is advantageously possible to achieve a compact power tool-parting device. "Integral with" is to be understood to mean, in particular, connected at least by adhesive force, for example by a welding process, a bonding process, an injection process and/or another process considered appropriate by persons skilled in the art, and/or, advantageously, formed in one piece such as, for example, by being produced from a casting and/or by being produced in a single or multi-component injection process and, advantageously, from a single blank. Particularly preferably, the cutter carrier element has a connecting element, and has a connecting recess for receiving a connecting element of the further cutter carrier element that can be connected to the cutter carrier element. In an alternative design of the power-tool parting device according to the disclosure, the connecting element is realized as a component that is realized so as to be separate from the cutter carrier element. The cutter carrier elements in this case preferably each have two connecting recesses, into each of which a connecting element can be inserted, wherein the connecting element, following insertion, is fixed to the cutter carrier element and the further cutter carrier element by means of a forming process such as, for example, a stamping process, or by means of an adhesive process. Advantageously, owing to the one-piece design of the connecting element, the amount of assembly work required can be kept to a minimum.

The term "cutting plane" is intended here to define, in particular, a plane in which the cutting strand, when in at least one operating state, is moved, relative to the guide unit, along a circumference of the guide unit, in at least two mutually opposite cutting directions. Preferably, while work is being performed on a workpiece, the cutting plane is aligned at least substantially transversely in relation to a workpiece surface on which work is to be performed. "At least substantially transversely" is intended here to mean, in particular, an alignment of a plane and/or a direction, relative to a further plane and/or a further direction, that is preferably other than a parallel alignment of the plane and/or the direction relative to the further plane and/or the further direction.

It is also conceivable, however, for the cutting plane, while work is being performed on a workpiece, to be aligned at least substantially parallelwise in relation to a workpiece surface on which work is to be performed, in particular if the cutting strand is realized as an abrasive means, etc. "At least substantially parallel" is intended here to mean, in particular, an alignment of a direction relative to a reference direction, in particular in one plane, the direction deviating from the reference direction by, in particular, less than 8°, advantageously less than 5°, and particularly advantageously less than 2°.

A "cutting direction" is to be understood here to mean, in particular, a direction along which the cutting strand is moved, when in at least one operating state, as a result of a driving force and/or a driving torque, in particular in the guide unit, for the purpose of generating a cutting clearance and/or parting-off and/or removing material particles of a workpiece on which work is to be performed. Preferably, the cutting strand, when in an operating state, is moved, relative to the guide unit, along the cutting direction. The cutting strand and the guide unit preferably together constitute a closed system. The term "closed system" is intended here to define, in particular, a system comprising at least two components that, by means of combined action, when the system has been demounted from a system such as, for example, a power tool, that is of a higher order than the system, maintain a functionality and/or are inseparably connected to each other when in the demounted state. Preferably, the at least two components of the closed system are connected to each other so as to be at least substantially inseparable by an operator. "At least substantially inseparable" is to be understood here to mean, in particular, a connection of at least two components that can be separated from each other only with the aid of parting tools such as, for example, a saw, in particular a mechanical saw, etc. and/or chemical parting means such as, for example, solvents, etc. Advantageously, the design according to the disclosure makes it possible to prevent, at least to a very large extent, a lateral displacement of the cutter carrier element relative to the further cutter carrier element during operation, in particular during the making of a cut, etc. Thus, advantageously, a precise work result can be achieved.

Furthermore, it is proposed that the transverse securing element be disposed on the connecting element. Particularly preferably in this case, after the cutter carrier element has been coupled to the further cutter carrier element, the transverse securing element is formed on to the connecting element by a forming process. Preferably, following coupling and following forming-on of the transverse securing element, the cutter carrier element and the further cutter carrier element have at least one clearance fit. Preferably, a rotatable mounting is realized by means of the clearance fit and by means of a combined action of the connecting element of the cutter carrier element and a connecting recess of the further cutter carrier element. Advantageously, by means of the design according to the disclosure, the cutter carrier element can be reliably secured against displacement relative to the further cutter carrier element while work is being performed on a workpiece by means of the power-tool parting device according to the disclosure.

Advantageously, the connecting element is realized in the form of a stud. In this case, the connecting element has a circular cross section, as viewed in a plane that is at least substantially parallel to the cutting plane. Particularly preferably, the connecting element is realized in the form of a cylinder. It is also conceivable, however, for the connecting element to be of another design, considered appropriate by persons skilled in the art. A connecting element can be achieved by simple design means.

It is additionally proposed that the transverse securing element have at least one securing region that is at least substantially parallel to a cutting plane of the cutting strand. Preferably, the securing region is in the shape of a circular ring, or circle. It is also conceivable, however, for the securing region be of a different shape, considered appropriate by persons skilled in the art, such as, for example, shaped as a sector of a circular ring, or as a partial extension, etc. Particularly preferably, the securing region is formed directly on to the connecting element as the result of a forming process, after the cutter carrier element and the further cutter carrier element have been mounted. By means of the design of the power-tool parting device according to the disclosure, it is possible, through simple design means, to achieve guidance of the cutting strand. Moreover, by means of the design according to the disclosure, securing of the cutter carrier element can be realized by simple design means. Moreover, advantageously, it is advantageously possible to prevent the cutter carrier element and the further cutter carrier element from being unintentionally demounted after the transverse securing element securing region has been formed on.

Moreover, it is proposed that the cutter carrier element have at least one segment guide element, which is provided to limit a movement of the cutter carrier element, when disposed in a guide unit, as viewed in a direction away from the guide unit, at least along a direction that is at least substantially parallel to a cutting plane of the cutting strand. Particularly preferably, each cutter carrier element of the cutting strand of the power-tool parting device has at least one segment guide element, which is provided to limit a movement of the respective cutter carrier element, when disposed in a guide unit, as viewed in a direction away from the guide unit, at least along a direction that is at least substantially parallel to a cutting plane of the cutting strand. Preferably, the power-tool parting device has at least one guide unit for receiving the cutting strand, which guide unit comprises at least one segment counter guide element that corresponds with the segment guide element. A "guide unit" is to be understood here to mean, in particular, a unit provided to exert a constraining force upon the cutting strand, at least along a direction perpendicular to a cutting direction of the cutting strand, in order to define a possibility for movement of the cutting strand along the cutting direction. Preferably, the guide unit has at least one guide element, in particular a guide groove, by which the cutting strand is guided. Preferably, the cutting strand, as viewed in the cutting plane, is guided by the guide unit along an entire circumference of the guide unit, by means of the guide element, in particular the guide groove. It is thereby possible, through simple design means, to achieve guidance along a direction of the cutting strand that is at least substantially parallel to a cutting plane of the cutting strand.

The disclosure is additionally based on a method for producing at least one cutter carrier element of the cutting strand of the power-tool parting device according to the disclosure. In this case, in a first step of the method, the cutter carrier element is preferably punched out of a strip stock by means of a punching device. In this case, for example, the connecting element and further functional regions of the cutter carrier element may be formed on to the cutter carrier element by means of a combined action of a lower die and an upper die during the punching process. It is also conceivable, however, for the cutter carrier element to be produced by means of a metal injection molding method (MIM method), or by means of another method, considered appropriate by persons skilled in the art. The method of manufacture according to the disclosure makes it possible, advantageously, to achieve cost-effective production.

Particularly preferably, after at least the cutter carrier element has been coupled to the further cutter carrier element of the cutting strand, the transverse securing element is stamped on to a connecting element of the cutting strand by means of a stamping device. Advantageously, the cutter carrier element can be secured to the further cutter carrier element in a reliable manner.

Furthermore, the disclosure is based on a portable power tool having a coupling device for coupling in a form-fitting and/or force-fitting manner to a power-tool parting device according to the disclosure. A "portable power tool" is to be understood here to mean in particular a power tool, in particular a hand power tool, that can be transported by an operator without the use of a transport machine. The portable power tool has, in particular, a mass of less than 40 kg, preferably less than 10 kg, and particularly preferably less than 5 kg. Particularly preferably, the power-tool parting device according to the disclosure and the portable power tool according to the disclosure constitute a power tool system. Advantageously, it is possible to achieve a portable power tool that, particularly advantageously, is suitable for a broad spectrum of applications.

The power-tool parting device according to the disclosure and/or the portable power tool according to the disclosure are not intended in this case to be limited to the application and embodiment described above. In particular, the power-tool parting device according to the disclosure and/or the portable power tool according to the disclosure may have individual elements, components and units that differ in number from the number stated herein, in order to fulfill a principle of function described herein.

BRIEF DESCRIPTION OF THE DRAWINGS

Further advantages are given by the following description of the drawings. The drawings show an exemplary embodiment of the disclosure. The drawings, the description and the claims contain numerous features in combination. Persons skilled in the art will also expediently consider the features individually and combine them to create appropriate further combinations.

In the drawings.

DETAILED DESCRIPTION

Figure 1:
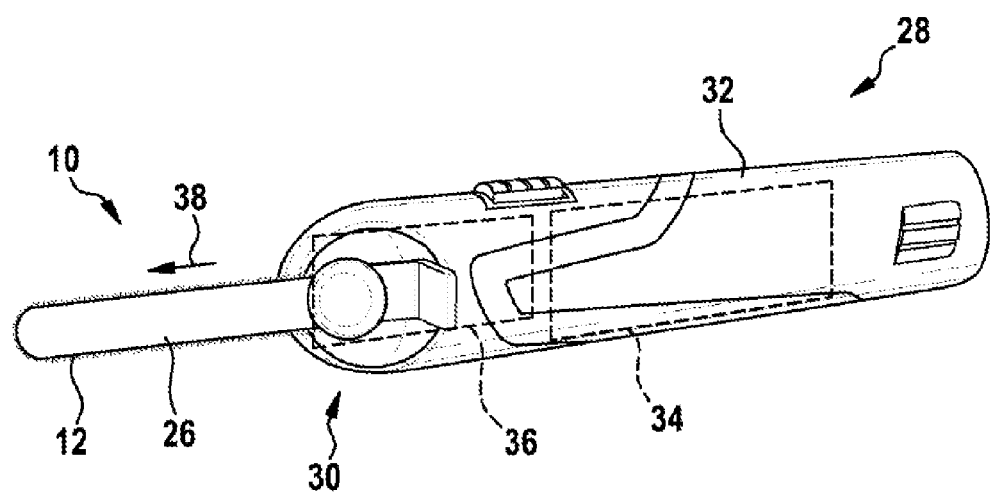
FIG. 1 shows a portable power tool according to the disclosure, having a power-tool parting device according to the disclosure, in a schematic representation.

FIG. 1 shows a portable power tool 28, comprising a power-tool parting device 10, which together constitute a power tool system. The portable power tool 28 has a coupling device 30 for coupling in a form-fitting and/or force-fitting manner to the power-tool parting device 10. The coupling device 30 in this case may be realized as a bayonet closure and/or as another coupling device, considered appropriate by persons skilled in the art. In addition, the portable power tool 28 has a power tool housing 32, which comprises a drive unit 34 and a transmission unit 36 of the portable power tool 28. The drive unit 34 and the transmission unit 36 are operatively coupled to each other to generate a driving torque that can be transmitted to the power-tool parting device 10, in a manner already known to persons skilled in the art. The transmission unit 36 is realized as a bevel gear transmission. The drive unit 34 is realized as an electric motor unit. It is also conceivable, however, for the drive unit 34 and/or the transmission unit 36 to be of a different design, considered appropriate by persons skilled in the art. The drive unit 34 is provided to drive a cutting strand 12 of the power-tool parting device 10 at a cutting speed of less than 6 m/s, when in at least one operating state. The portable power tool 28 in this case has at least one operating mode, in which it is possible for the cutting strand 12 to be driven at a cutting speed of less than 6 m/s, in a guide unit 26 of the power-tool parting device 10, along a cutting direction 38 of the cutting strand 12.

Figure 2:
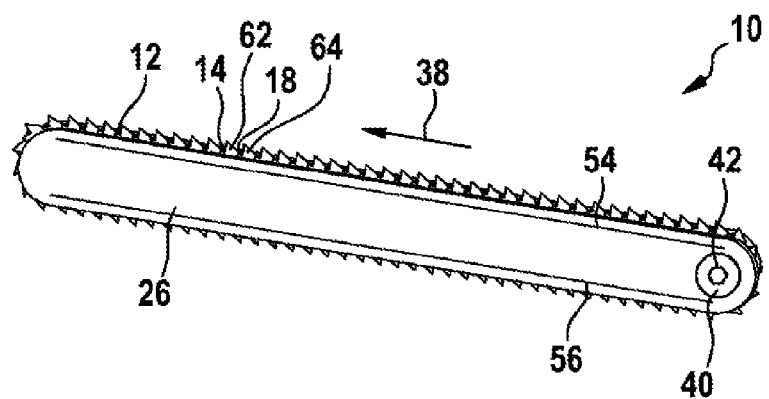
FIG. 2 shows a detail view of the power-tool parting device according to the disclosure, in a schematic representation.

FIG. 2 shows the power-tool parting device 10 decoupled from the coupling device 30 of the portable power tool 28. The power-tool parting device 10 has the cutting strand 12, which comprises at least one cutter carrier element 14. In addition, the power-tool parting device 10 has the guide unit 26, which, together with the cutting strand 12, constitutes a closed system. The cutting strand 12 is guided by means of the guide unit 26. For this purpose, the guide unit 26 has at least one guide groove (not represented in greater detail here). The cutting strand 12 is guided by means of edge regions of the guide unit 26 that delimit the guide groove. It is also conceivable, however, for the guide unit 26 to have a different element for guiding the cutting strand 12, considered appropriate by persons skilled in the art, such as, for example, as a rib-type means, formed on the guide unit 26, that engages in a recess on the cutting strand 12. During operation, the cutting strand 12 is moved in a revolving manner along the circumference of the guide unit 26, in the guide groove.

Figure 3:
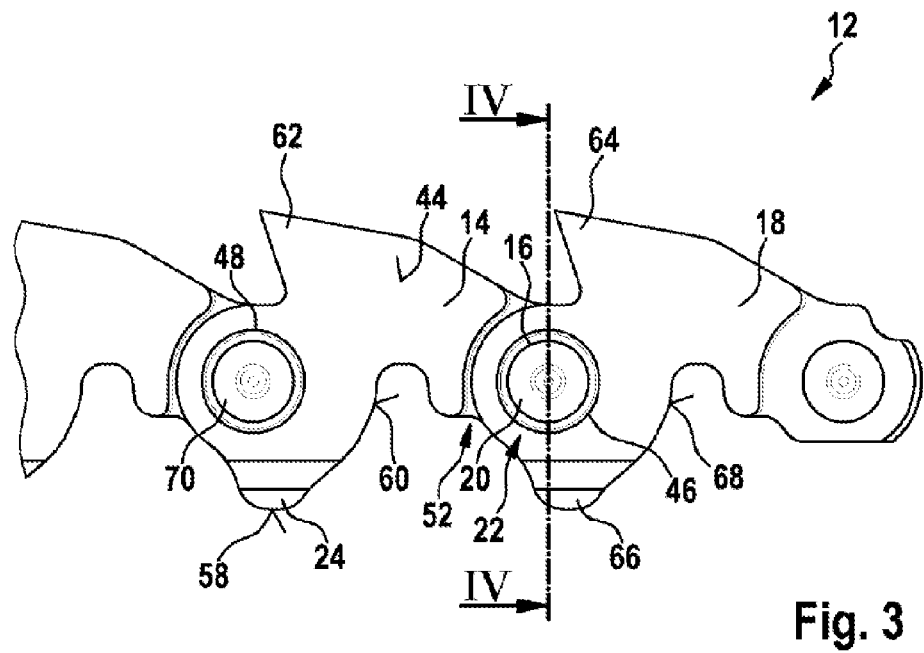
FIG. 3 shows a detail view of cutter carrying elements of a cutting strand of the power-tool parting device according to the disclosure, in a schematic representation.
Figure 4:
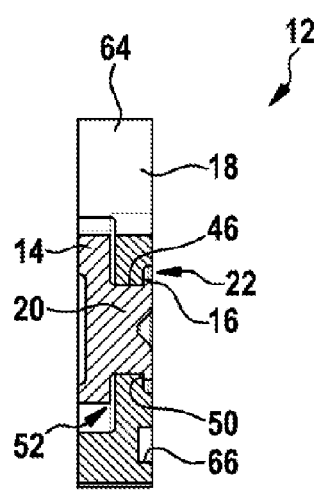
FIG. 4 shows a sectional view of the cutter carrier elements along the line Iv-Iv from FIG. 3, in a schematic representation.

The cutting strand 12 additionally has at least one connecting element 20, which is realized so as to be integral with the cutter carrier element 14 (FIGS. 3 and 4). The connecting element 20 is realized in the form of a stud. The connecting element 20 in this case is provided, by acting in combination with a connecting recess 46 of a further cutter carrier element 18 of the cutting strand 12, to realize a form-fitting connection between the cutter carrier element 14 and the further cutter carrier element 18. The cutter carrier element 14 likewise comprises a connecting recess 48, in which a further connecting element 70 of the cutting strand 12 can be disposed, in order to form the cutting strand 12. Each cutter carrier element of the cutting strand 12 thus comprises at least one connecting element and at least one connecting recess. The connecting element closes in an at least substantially flush manner with at least one outer face 44 of the cutter carrier element 14. It is also conceivable, however, for the connecting element 20 to project beyond the outer face 44, as viewed along a direction at least substantially perpendicular to the outer face 44. The cutter carrier element 14 in this case, when disposed in the guide groove, may be guided by means of the connecting element 20 at edge regions of the guide groove. Thus, by means of a combined action of the connecting elements and the connecting recesses, the cutter carrier elements are mounted so as to be pivotable relative to each other.

In addition, the cutter carrier element 14 has at least one transverse securing element 16, which is provided to secure insofar as possible the cutter carrier element 14, when in a mounted state, against a transverse movement relative to the further cutter carrier element 18 of the cutting strand 12 (FIG. 4). The cutter carrier element 14 has at least one stamped transverse securing element 16. The transverse securing element 16 is disposed on the connecting element 20. The transverse securing element 16 in this case has at least one securing region 22, which is at least substantially parallel to a cutting plane of the cutting strand 12. The securing region 22 is thus at least substantially parallel to the outer face 44 of the cutter carrier element 14. The transverse securing element 16 is stamped on to the connecting element 20 of the cutting strand 12 by means of a stamping device, after at least the cutter carrier element 14 has been coupled to the further cutter carrier element 18 of the cutting strand 12. The securing region 22 is thus realized as a result of the stamping of the transverse securing element 16.

The securing region 22 is provided, by acting in combination with a counter securing region 50, in the form of a groove having the shape of a circular ring, of the further cutter carrier element 18, to secure insofar as possible the cutter carrier element 14, when in a mounted state, in at least one direction that is at least substantially perpendicular to the outer face 44, against a transverse movement relative to the further cutter carrier element 18 of the cutting strand 12 (FIG. 4). Furthermore, following connection of the connecting element 20 and the connecting recess 46 of the further cutter carrier element 18, the cutter carrier element 14 is secured insofar as possible, in at least one further direction that is at least substantially perpendicular to the outer face 44, against a transverse movement relative to the further cutter carrier element 18 of the cutting strand 12, by means of a combined action of an edge region of the further cutter carrier element 18, that delimits the connecting recess 46 of the further cutter carrier element 18, with a coupling region 52 of the cutter carrier element 14 that surrounds the connecting element 20. In this case, each cutter carrier element of the cutting strand 12 comprises at least one transverse securing element, which is disposed on the connecting element by means of stamping, after coupling to the further cutter carrier element.

Furthermore, the cutter carrier element 14 has at least one segment guide element 24, which is provided to limit a movement of the cutter carrier element 14, when disposed in the guide unit 26, as viewed in a direction away from the guide unit, at least along a direction that is at least substantially parallel to a cutting plane of the cutting strand 12. The segment guide element 24 is constituted by a transverse extension, which extends at least substantially perpendicularly in relation to the outer face 44 of the cutter carrier element 14. The segment guide element 24 in this case delimits a longitudinal groove. The segment guide element 24 is provided to act in combination with segment counter guide elements 54, 56 of the guide unit 26 that are disposed on an inner face of the guide unit 26 that faces toward the cutter carrier element 14, for the purpose of limiting movement (FIG. 2). The segment counter guide elements 54, 56 are realized so as to correspond with the segment guide element 24 of the cutter carrier element 14. The further cutter carrier element 18 likewise has a segment guide element 66. Thus, in this case, each cutter carrier element of the cutting strand 12 comprises at least one segment guide element, which is provided to limit a movement of the cutter carrier elements, when disposed in the guide unit 26, as viewed in a direction away from the guide unit 26, at least along a direction that is at least substantially parallel to the cutting plane of the cutting strand 12.

Moreover, the cutter carrier element 14 has a compressive-force transfer face 58. The compressive-force transfer face 58 is provided, by acting in combination with a compressive-force absorption region (not represented in greater detail here) of the guide unit 26, to support compressive forces that act upon the cutting strand 12 as work is being performed on a workpiece (not represented in greater detail here). In this case, the compressive-force absorption region of the guide unit 26, as viewed along a direction that is at least substantially perpendicular to the cutting plane of the cutting strand 12, is disposed between two outer faces of the guide unit 26 that are at least substantially parallel to each other. In this case, each cutter carrier element of the cutting strand 12 comprises a compressive-force transfer face.

The cutter carrier element 14 additionally has a driving face 60, which is provided to act in combination with driving faces of a torque transmission element 40 (FIG. 2) of the power-tool parting device, for the purpose of driving the cutting strand 12. The driving faces of the torque transmission element 40 in this case are realized as tooth flanks. In this case, the driving face 60 of the cutter carrier element 14 is realized so as to correspond with the driving faces of the torque transmission element 40. When the cutting strand 12 is being driven, the tooth flanks of the torque transmission element 40 bear temporarily against the driving face 60, for the purpose of transmitting driving forces. The further cutter carrier element 18 in this case likewise has a driving face 68. Each cutter carrier element of the cutting strand 12 thus comprises a driving face.

For the purpose of driving the cutting strand 12, the torque transmission element 40 is rotatably mounted in the guide unit 26. For the purpose of driving the cutting strand 12, the torque transmission element 40, when in a mounted state, is coupled to a pinion (not represented in greater detail here) of the drive unit 34 and/or to a gear wheel (not represented in greater detail here) and/or to a toothed shaft (not represented in greater detail here) of the transmission unit 36. The torque transmission element 40 in this case has a coupling recess 42 that, when in a mounted state, can be coupled to a driving element of the portable power tool 28. The coupling recess 42 is disposed concentrically in the torque transmission element 40. In addition, the coupling recess 42 is provided to be coupled to the pinion (not represented in greater detail here) of the drive unit 34 and/or to a gear wheel (not represented in greater detail here) and/or to a toothed shaft (not represented in greater detail here) of the transmission unit 36, when the torque transmission element 40 and/or the power-tool parting device 10 are/is in a coupled state. The coupling recess 42 is realized as a hexagon socket. It is also conceivable, however, for the coupling recess 42 to be of a different design, considered appropriate by persons skilled in the art. Moreover, it is conceivable for the power-tool parting device 10, in an alternative design, not represented in greater detail here, to be realized so as to act in isolation from the torque transmission element 40. In this case, the pinion (not represented in greater detail here) of the drive unit 34 and/or to a gear wheel (not represented in greater detail here) and/or to a toothed shaft (not represented in greater detail here) of the transmission unit 36 would engage directly in the guide unit 26, and would act in isolation from interposition of a torque transmission element, disposed in the guide unit 26, for the purpose of driving the cutting strand 12.

In addition, the cutting strand 12 has at least one cutting element 62. The cutting element 62 is realized so as to be integral with the cutter carrier element 14. The cutting element 62 is provided to enable a workpiece (not represented in greater detail here) on which work is to be performed to be parted off, and/or to enable material particles to be removed therefrom. The cutter carrier element 14 and the cutting element 62 in this case are punched out of a strip stock, as a single piece, in one operation. The further cutter carrier element 18 likewise comprises an integrally formed-on cutting element 64. Each cutter carrier element of the cutting strand 12 thus comprises a cutting element. The cutting elements 62, 64 in this case may have a cutting layer (not represented in greater detail here) that comprises at least titanium carbide. The cutting layer is applied to the cutting elements 62, 64 by means of a CVD process. It is also conceivable, however, for the cutting layer to comprise, alternatively or additionally, another material such as, for example, titanium nitride, titanium carbonitride, aluminum oxide, titanium aluminum nitride, chromium nitride or zirconium carbonitride. Moreover, it is also conceivable for the cutting layer to be applied by means of another process, considered appropriate by persons skilled in the art, such as, for example, by means of a PVD or PACVD process. Furthermore, it is conceivable for the cutting elements 62, 64 to be provided with particles. In this case, the cutting elements 62, 64 may be provided with diamond particles, hard metal particles, or other particles considered appropriate by persons skilled in the art.

The invention claimed is:

1. A power-tool parting device, comprising:
   at least one cutting strand that includes:
   a plurality of cutter carrier elements, each cutter carrier element defining:
   a stud extending transversely from the cutter carrier element to form an integral connecting element; and
   a connecting recess, the connecting element of each cutter carrier element received in the connecting recess of a respective succeeding cutter carrier element to form the at least one cutting strand; and
   a plurality of transverse securing elements separate from the cutter carrier elements,
   each transverse securing element having a shape of at least a sector of a circular ring; and
   a respective transverse securing element positioned around the connecting element of each cutter carrier element and over the respective succeeding cutter carrier element such that:
   the shape of the respective transverse securing element surrounds the connecting element of each cutter carrier element; and
   the respective succeeding cutter carrier element is held between each cutter carrier element and the respective transverse securing element to secure the plurality of cutter carrier elements, when in a mounted state, against a transverse movement relative to each other.

2. The power-tool parting device as claimed in claim 1, wherein the respective transverse securing element has at least one securing region defining a surface that is at least substantially parallel to a cutting plane of the cutting strand and that is recessed from an outer face of the connecting element of each cutter carrier element in a mounted state.

3. The power-tool parting device as claimed in claim 1, further comprising:
   a guide unit configured to receive the cutting strand;
   wherein each cutter carrier element further defines at least one segment guide element configured to limit a movement of the cutter carrier element, when disposed in the guide unit as viewed in a direction away from the guide unit, at least along a direction that is at least substantially parallel to a cutting plane of the cutting strand.

4. The power-tool parting device as claimed in claim 1, wherein the power-tool parting device is configured as a hand power-tool parting device.

5. A method for producing a cutting strand of a power-tool parting device, comprising:
   forming a plurality of cutter carrier elements;
   forming, in each of the cutter carrier elements, at least one stud that extends transversely from the cutter carrier element to define an integral connecting element;
   forming, in each of the cutter carrier elements, at least one connecting recess;
   coupling the plurality of cutter carrier elements together to form a cutting strand by inserting the at least one connecting element of each cutter carrier element into the connecting recess of a respective succeeding cutter carrier element; and
   after coupling the plurality of cutter carrier elements together, installing, via a stamping process, a respective transverse securing element on the at least one connecting element of each cutter carrier element and over the respective succeeding cutter carrier element such that:
   an at least sectoral ring shape of the respective transverse securing element surrounds the connecting element of each cutter carrier element; and
   the respective succeeding cutter carrier element is held between each cutter carrier element and the respective transverse securing element to secure the plurality of cutter carrier elements, when in a mounted state, against a transverse movement relative to each other.

6. The method as claimed in claim 5, wherein the stamping process includes deforming the respective transverse securing element via interaction of the respective transverse securing element between the connecting element of each cutter carrier element and a stamping device to form a securing region of the respective transverse securing element,
   the securing region defining a surface substantially parallel to a cutting plane of the cutting strand and recessed from an outer face of the connecting element of each cutter carrier element.

7. A portable power tool, comprising:
   a power-tool parting device including:
   at least one cutting strand that has:
   a plurality of cutter carrier elements, each cutter carrier element defining:
   a stud extending transversely from the cutter carrier element to form an integral connecting element; and
   a connecting recess, the connecting element of each cutter carrier element received in the connecting recess of a respective succeeding cutter carrier element to form the at least one cutting strand; and
   a plurality of transverse securing elements separate from the cutter carrier elements,
   each transverse securing element having a shape of at least a sector of a circular ring; and
   a respective transverse securing element positioned around the connecting element of each cutter carrier element and over the respective succeeding cutter carrier element such that:

the at least sector of the circular ring of the respective transverse securing element surrounds the connecting element of each cutter carrier element; and the respective succeeding cutter carrier element is held between each cutter carrier element and the respective transverse securing element to secure the plurality of cutter carrier elements, when in a mounted state, against a transverse movement relative to each other; and a coupling device configured to couple the power-tool parting device to the portable power tool in one or more of a form-fitting manner and a force-fitting manner.

8. The portable power tool as claimed in claim 7, wherein the coupling of the portable power tool and the power-tool parting device forms a power tool system.

* * * * *